United States Patent [19]

Barbier et al.

[11] Patent Number: 5,295,354
[45] Date of Patent: Mar. 22, 1994

[54] LOW POLLUTION COMBUSTION CHAMBER FOR A TURBOJET ENGINE

[75] Inventors: Gérard Y. G. Barbier, Morangis; Xavier, M. H. Bardey, Chartrettes; Michel A. A. Desaulty, Vert Saint Denis; Serge M. Meunier, Le Chatelet en Brie, all of France

[73] Assignee: Societe Nationale d'Etude et de Construction de Moteurs D'Aviation (S.N.E.C.M.A.), Valin, France

[21] Appl. No.: 834,820

[22] Filed: Feb. 13, 1992

[30] Foreign Application Priority Data

Feb. 13, 1991 [FR] France .................. 91 01640

[51] Int. Cl.$^5$ .............................................. F02C 3/14
[52] U.S. Cl. ...................................... 60/731; 60/733; 60/747
[58] Field of Search ............... 60/731, 733, 746, 747, 60/748, 760

[56] References Cited

U.S. PATENT DOCUMENTS

| 3,934,409 | 1/1976 | Quillévéré et al. ............ 60/733 |
| 4,168,609 | 9/1979 | Greenberg et al. ............ 60/746 |
| 4,765,146 | 8/1988 | Hellat et al. ................... 60/746 |

FOREIGN PATENT DOCUMENTS

| 954465 | 6/1956 | Fed. Rep. of Germany . |
| 2412120 | 9/1974 | Fed. Rep. of Germany . |
| 2402068 | 3/1979 | France . |
| 0240833 | 11/1985 | Japan ........................... 60/733 |
| 2010407 | 6/1979 | United Kingdom . |
| 2044433 | 10/1980 | United Kingdom . |

OTHER PUBLICATIONS

Carlstrom, L. A. "Improved Emissions Performance in Today's Combustion System." AEG/SOA 7805 (Jun., 1978): p. 17.

Lefebvre, Arthur H. *Gas Turbine Combustion.* New York, N.Y.: McGraw-Hill, 1983. pp. 17-20.

*Primary Examiner*—Richard A. Bertsch
*Assistant Examiner*—Timothy S. Thorpe
*Attorney, Agent, or Firm*—Bacon & Thomas

[57] ABSTRACT

A low pollution combustion chamber for a turbojet engine is disclosed in which first and second combustion chambers are oriented in a counter-flow direction and both combustion chambers communicate with a separate and distinct exhaust chamber. The first combustion chamber has a fuel injector, as well as a primary oxidizer intake, and the wall bounding the first combustion chamber defines a plurality of dilution oxidizer intake orifices. The wall also defines a first exhaust orifice located approximately midway between the upstream and downstream ends of the first combustion chamber. A second combustion chamber has a second fuel injector, as well as a second primary oxidizer intake, but the wall defining the second combustion chamber does not define any dilution oxidizer intake orifices. A second exhaust orifice also communicates with the exhaust chamber. The orientations of the first and second combustion chambers are such that the fuel/oxidizer mixtures traveling through the combustion chambers travel in a generally counterflow arrangement. A separate exhaust chamber is included in the combustion chamber assembly and communicates with the first and second combustion chambers such that the burned gases from these chambers enter the exhaust chamber. The exhaust chamber defines a third exhaust orifice through which the burned gases exit the combustion chamber assembly. The exhaust chamber is oriented such that the exhaust gases passing through this exhaust chamber travel in a direction generally parallel to the gases traveling through the second combustion chamber. A wall defining the combustion chamber defines a second plurality of dilution oxidizer intake orifices so that oxidizer may dilute the exhaust gases passing through this chamber.

13 Claims, 1 Drawing Sheet

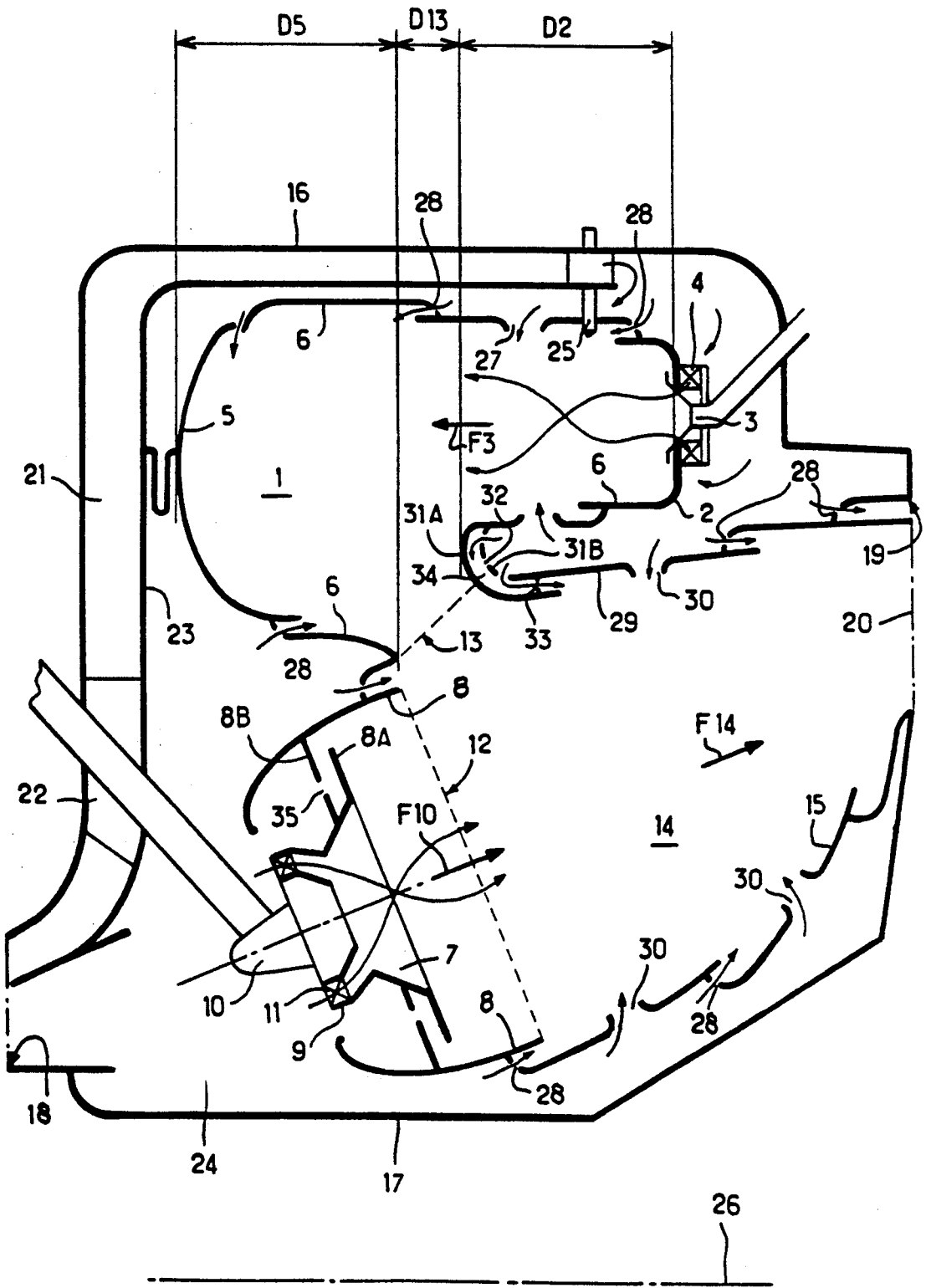

LOW POLLUTION COMBUSTION CHAMBER FOR A TURBOJET ENGINE

BACKGROUND OF THE INVENTION

Combustion chamber assemblies for gas turbine engines are known which have a first combustion chamber with a first fuel injector and first primary oxidizer intake orifices for low power operation and a second combustion chamber, distinct from the first combustion chamber, provided with a second fuel injector and second primary oxidizer intake orifices for full power operation. These known combustion chamber assemblies may have a third chamber for exhausting the burned combustion gases distinct from the first and second combustion chambers, each of which direct their burned combustion gases into the exhaust chamber. Such a combustion chamber assembly is described in the French patent 2,402,068.

In this French patent, the fuel injectors for the first and second combustion chambers direct fuel into their respective combustion chambers in the same direction. This configuration limits the dwell time of the gases in the first combustion chamber and, hence, provides incomplete combustion of these gases thereby resulting a high proportion of unburned substances and high pollution in the exhaust gases emanating from such combustion chamber assemblies.

SUMMARY OF THE INVENTION

A low pollution combustion chamber for a turbojet engine is disclosed in which first and second combustion chambers are oriented in a counter-flow direction and both combustion chambers communicate with a separate and distinct exhaust chamber. The first combustion chamber has a fuel injector, as well as a primary oxidizer intake, and the wall bounding the first combustion chamber defines a plurality of dilution oxidizer intake orifices. The wall also defines a first exhaust orifice located approximately midway between the upstream and downstream ends of the first combustion chamber.

A second combustion chamber has a second fuel injector, as well as a second primary oxidizer intake, but the wall defining the second combustion chamber does not define any dilution oxidizer intake orifices. A second exhaust orifice also communicates with the exhaust chamber. The orientations of the first and second combustion chambers are such that the fuel/oxidizer mixtures traveling through the combustion chambers travel in a generally counterflow arrangement.

A separate exhaust chamber is included in the combustion chamber assembly and communicates with the first and second combustion chambers such that the burned gases from these chambers enter the exhaust chamber. The exhaust chamber defines a third exhaust orifice through which the burned gases exit the combustion chamber assembly. The exhaust chamber is oriented such that the exhaust gases passing through this exhaust chamber travel in a direction generally parallel to the gases traveling through the second combustion chamber. A wall defining the combustion chamber defines a second plurality of dilution oxidizer intake orifices so that oxidizer may dilute the exhaust gases passing through this chamber.

A wall segment joining the first combustion chamber and the exhaust chamber, and located adjacent to the exhaust orifice of the first combustion chamber has a pair of spaced apart wall elements which define therebetween a cooling channel. One of the wall elements has a plurality of cooling orifices through which the oxidizer may pass into the cooling channel. A cooling channel outlet is defined in the interior of the exhaust chamber to allow the oxidizer to exit from the cooling channel and pass along an inner surface of the exhaust chamber to cool this surface.

The fuel/oxidizer mixture supplied to the first combustion chamber is a rich mixture relative to the stoichiometric mixture. The fuel/oxidizer mixture in the second combustion chamber is a lean mixture relative to the stoichiometric mixture.

The low pollution combustion chamber assembly according to this invention increases the dwell time of the burned gases in the first combustion chamber resulting in improved fuel consumption and the reduction of unburned gases. This combustion chamber assembly also improves the burned gas mixture in the first and second combustion chambers and in their dilution by a large flow of dilution oxidizer.

BRIEF DESCRIPTION OF THE FIGURE

The single FIGURE is a partial, longitudinal, cross-sectional view of the combustion chamber assembly according to the present invention.

DETAILED DESCRIPTION OF THE PREFERRED EMBODIMENT

As illustrated in the Figure, the combustion chamber assembly according to the present invention comprises a first combustion chamber 1 bounded by a wall comprising an upstream wall segment 2 defining the upstream end of the combustion chamber 1, a downstream wall segment 5 defining the downstream end of the combustion chamber 1 and an intermediate wall segment 6 interconnecting the wall segments 2 and 5. A first fuel injector 3 is mounted on upstream wall segment 2 and, along with primary oxidizer intake orifice 4 surrounding the fuel injector 3, introduces a fuel/air mixture into the combustion chamber 1 in the direction of arrow F3.

Second combustion chamber 7 is defined and bounded by wall 8 which has a support portion 8A in which is mounted a support 9 for attaching the second fuel injector 10 and the second primary oxidizer intake orifice 11. Second combustion chamber 7 also defines a second exhaust orifice 12 through which the combustion gases exit the second combustion chamber. Similarly, first combustion chamber 1 defines a first exhaust orifice 13 through which the burned gases exit from the first combustion chamber.

An exhaust chamber 14 is bounded by inner wall 15 and outer wall 29 and communicates with the first and second combustion chambers via the first and second exhaust orifices 12 and 13, respectively. Exhaust chamber 14 defines a third exhaust orifice 20 through which the burned exhaust gases exit the combustion chamber assembly.

A casing having external wall 16 and internal wall 17 surrounds the combustion chamber assembly and defines intake orifice 18 and exhaust orifice 19. Intake orifice 18 is located on the upstream end of the casing and communicates with a known oxidizer compressor (not shown) to supply compressed oxidizer to the combustion chamber assembly. Exhaust orifice 19 communicates with the third exhaust gas orifice 20 of the exhaust chamber 14 allowing burned exhaust gases to exit from the assembly.

A space 21 is defined between the external wall 16 of the casing and the wall segments 2, 5 and 6 defining the first combustion chamber 1. An additional compressor 22 may be located in this space and be further separated from the interior of the casing by a partition 23. Partition 23 divides the interior of the casing into two distinct spaces, namely space 21 and a space 24. Interior space 24 communicates directly with the intake orifice 18.

As can be seen from the Figure, the directions of the flow of gases through the first and second combustion chambers, illustrated by arrows F3 and F10, respectively, are in substantially opposite directions. Thus, the first and second combustion chambers are arranged in a substantially counterflow configuration and exhaust gases from both combustion chambers enter into the exhaust chamber 14.

One or more ignition devices 25 (such as spark plugs) communicate with the interior of the first combustion chamber 1 near the fuel injector 3 to ignite the fuel/oxidizer mixture.

The first exhaust orifice 13 is defined by intermediate wall segment 6 of the first combustion chamber 1 and is located approximately equidistant from the upstream end and downstream ends of the combustion chamber 1. The distances D2 and D5, measured parallel to the central axis 26 of the combustion chamber assembly are approximately equal and are measured from the upstream end of the combustion chamber 1 to the upstream edge of the first exhaust orifice 13 (D2) and from the downstream end of the combustion chamber 1 to the downstream edge of the first exhaust orifice 13 (D5). The longitudinal extent of the first exhaust orifice 13, illustrated as D13 is, thus, substantially equidistant from the upstream and downstream ends of the combustion chamber 1.

The intermediate wall segment 6 of the combustion chamber 1 defines a plurality of dilution oxidizer intake orifices 27 to enable the oxidizer to pass into the combustion chamber and dilute the combustion gases therein.

Similarly, walls 15 and 29, defining the exhaust chamber 14, define a second plurality of dilution oxidizer intake orifices 30, which enable the oxidizer to pass into the exhaust chamber 14 to dilute the burned exhaust gases therein. The dilution oxidizer in the exhaust chamber dilutes all of the gases passing through this chamber, including combustion gases from the second combustion chamber 7.

The second combustion chamber 7 does not have dilution oxidizer orifices, but only defines primary oxidizer intake orifice 11.

The fuel injector 3 is operatively connected to a fuel supply means such that, when the gas turbine engine is operating at low power under low load, the first combustion chamber 1 contains a fuel/oxidizer mixture rich relative to the stoichiometric mixture. Fuel injector 10, which is also operatively associated with a fuel supply means, enables the operation of the second combustion chamber 7 under full power, full load conditions, with a fuel/oxidizer mixture lean relative to the stoichiometric mixture.

As can be seen in the Figure, the direction of gases traveling through exhaust chamber 14 is in the direction of arrow F14 which is substantially parallel to the direction of gas travel through the second combustion chamber 7, illustrated by arrow F10.

In known fashion, the intermediate wall segment 6, as well as the walls 15 and 29 define a series of oxidizer film intake orifices 28 which, in known fashion, enable the oxidizer to pass through these walls and form a cooling film on an interior surface of the walls.

A wall segment joining the first combustion chamber 1 to the exhaust chamber 14 is located adjacent to the first exhaust orifice 13 and comprises a pair of wall elements 31A and 31B which are spaced apart so as to define therebetween a cooling channel 34. One of the wall elements, in this case wall element 31B, defines a plurality of cooling orifices 32 enabling a portion of the oxidizer within the casing to pass therethrough and into the cooling channel 34. Cooling exit orifice 33 communicates with the cooling chamber 34 and enables the oxidizer to exit from the cooling chamber along an interior surface of wall 29 defining a portion of the exhaust chamber 14. The gases exit generally tangentially to the wall 29 in order to form a cooling film on an inner surface of this wall.

The portion 8A of the wall defining the second combustion chamber 7 has a substantially frusto-conical bowl shape and is affixed to wall 8 by means of a transverse shroud 8B fixedly attached to the two parts, such as by welding. Shroud 8B defines communication orifices 35 to enable the oxidizer to pass between space 24 and the interior of the second combustion chamber 7.

The exhaust chamber 14 constitutes the exhaust gas enclosure for the burned gases emanating from the first combustion chamber 1 and, at full load, for the second combustion chamber 7. Under low power, low load conditions of the gas turbine engine, only the first combustion chamber 1 is in operation. Under full load, the second combustion chamber 7 also becomes operative.

The combustion chamber assembly of this invention achieves a low-pollution combustion of a rich mixture in the first combustion chamber 1, which is stable on account of the counter-flow arrangement of the fuel injection into this combustion chamber relative to the direction F14 in which the burned gases are exhausted from the exhaust chamber 14.

The design of this combustion chamber also achieves low pollution operation under full load conditions by providing two separate combustion chambers, one having a rich mixture, the other a lean fuel oxidizer mixture, and both being well away from the stoichiometric mixture, which is the most polluting. Combustion in full load operation is carried out for a very homogeneous lean mixture which further increases the stability.

Obviously, the primary oxidizer intakes 4 and 11 may be of a known, variable geometry type and may be fitted with controls to control the oxidizer flow through the intakes.

The oxidizer required to operate under full power enters through intake orifice 18. A portion of this oxidizer intake flow enters space 24 and a portion enters the space 21. To properly supply the oxidizer for low power operation, an additional compressor stage 22 may be located in the space 21. Compressor stage 22 may be either radial or axial in configuration.

The foregoing description is provided for illustrative purposes only and should not be construed as in any way limiting this invention, the scope of which is defined solely by the appended claims.

We claim:

1. A low pollution combustion chamber assembly for a gas turbine engine comprising:
   a) first wall means bounding a first combustion chamber for low power operation having first fuel injector means, a first primary oxidizer intake located so as to mix injected fuel with the oxidizer in the first combustion chamber, ignition means to ignite the fuel/oxidizer mixture, and defining a first exhaust orifice, the first wall means defining a plurality of first dilution oxidizer intake orifices to allow oxidizer to pass therethrough into the first combustion chamber;
   b) second wall means bounding a second combustion chamber for full power operation arranged in a generally parallel, counter-flow arrangement with respect to the first combustion chamber, the second combustion chamber having second fuel injection means, a second primary oxidizer intake located so as to mix injected fuel with the oxidizer in the second combustion chamber, and defining a second exhaust orifice such that exhaust gases from one combustion chamber do not communicate with the other combustion chamber, the second wall means defining no dilution intake orifices; and,
   c) an exhaust chamber communicating directly with both of the first and second exhaust orifices and defining a third exhaust orifice to exhaust burned combustion gases from the combustion chamber assembly, the third wall means defining a plurality of second dilution oxidizer intake orifices to allow oxidizer to pass therethrough into the exhaust chamber.

2. The low pollution combustion chamber assembly of claim 1 wherein the first fuel injection means injects fuel into the first combustion chamber in a first direction, and wherein the second fuel injection means injects fuel into the second combustion chamber in a second direction generally opposite to the first direction.

3. The low pollution chamber assembly of claim 2 wherein the exhaust chamber is oriented with respect to the second combustion chamber such that gases traveling toward the third exhaust orifice travel in a direction substantially parallel to the second direction in which fuel is injected into the second combustion chamber.

4. The low pollution combustion chamber assembly of claim 1 wherein the first wall means comprises:
   a) a first wall segment in which the first fuel injection means is mounted and defining a first end of the first combustion chamber;
   b) a second wall segment defining a second end of the first combustion chamber located opposite to the first wall segment; and,
   c) a third wall segment interconnecting the first and second wall segments and defining the first exhaust orifice.

5. The low pollution combustion chamber assembly of claim 4 wherein the first exhaust orifice is located approximately equidistant from the first and second ends of the first combustion chamber.

6. The low pollution combustion chamber assembly 4 further comprising a fourth wall segment adjacent to the first exhaust orifice and joining the third wall segment to the third wall means wherein the fourth wall segment comprises a pair of spaced apart wall elements defining a cooling channel therebetween, one of the wall elements defining cooling orifices allowing oxidizer to pass therethrough into the cooling channel.

7. The low pollution combustion chamber assembly of claim 6 wherein the fourth wall segment defines cooling exit orifices to permit oxidizer in the cooling channel to exit therefrom along a surface of the third wall means.

8. A low pollution combustion chamber assembly for a gas turbine engine comprising:
   a) a first combustion chamber for lower power operation having first fuel injector means, a first primary oxidizer intake located so as to mix injected fuel with the oxidizer in the first combustion chamber, ignition means to ignite the fuel/oxidizer mixture, and defining a first exhaust orifice;
   b) a second combustion chamber for full power operation arranged in a generally parallel, counter-flow arrangement with respect to the first combustion chamber, the second combustion chamber having second fuel injection means, a second primary oxidizer intake located so as to mix injected fuel with the oxidizer in the second combustion chamber, and defining a second exhaust orifice such that exhaust gases from one combustion chamber do not communicate with the other combustion chamber; and,
   c) an exhaust chamber communicating directly with both of the first and second exhaust orifices and defining a third exhaust orifice to exhaust burned combustion gases from the combustion chamber assembly, wherein the exhaust chamber is oriented with respect to the second combustion chamber such that gases traveling toward the third exhaust orifice travel in a direction substantially parallel to the direction in which fuel is injected into the second combustion chamber.

9. The low pollution combustion chamber assembly of claim 8 wherein the first fuel injection means injects fuel into the first combustion chamber in a first direction, and wherein the second fuel injection means injects fuel into the second combustion chamber in a second direction generally opposite to the first direction.

10. A low pollution combustion chamber assembly for a gas turbine engine comprising:
   a) first wall means bounding a first combustion chamber for low power operation having first fuel injector means, a first primary oxidizer intake located so as to mix injected fuel with the oxidizer in the first combustion chamber, ignition means to ignite the fuel/oxidizer mixture, and defining a first exhaust orifice wherein the first wall means comprises:
      i) a first wall segment in which the first fuel injection means is mounted and defining a first end of the first combustion chamber;
      ii) a second wall segment defining a second end of the first combustion chamber located opposite to the first wall segment; and,
      iii) a third wall segment interconnecting the first and second wall segments and defining the first exhaust orifice;
   b) second wall means bounding a second combustion chamber for full power operation arranged in a generally parallel, counter-flow arrangement with respect to the first combustion chamber, the second combustion chamber having second fuel injection means, a second primary oxidizer intake located so as to mix injected fuel with the oxidizer in the second combustion chamber, and defining a second exhaust orifice such that exhaust gases from one combustion chamber do not communicate with the other combustion chamber; and, c) an exhaust chamber communicating directly with both of the first and second exhaust orifices and defining a third exhaust orifice to exhaust burned combustion gases from the combustion chamber assembly.

11. The low pollution combustion chamber assembly of claim 10 wherein the first exhaust orifice is located approximately equidistant from the first and second ends of the first combustion chamber.

12. The low pollution combustion chamber assembly 10 further comprising a fourth wall segment adjacent to the first exhaust orifice and joining the third wall segment to the third wall means wherein the fourth wall segment comprises a pair of spaced apart wall elements defining a cooling channel therebetween, one of the wall elements defining cooling orifices allowing oxidizer to pass therethrough into the cooling channel.

13. The low pollution combustion chamber assembly of claim 12 wherein the fourth wall segment defines cooling exit orifices to permit oxidizer in the cooling channel to exit therefrom along a surface of the third wall means.

* * * * *